Figure 2:
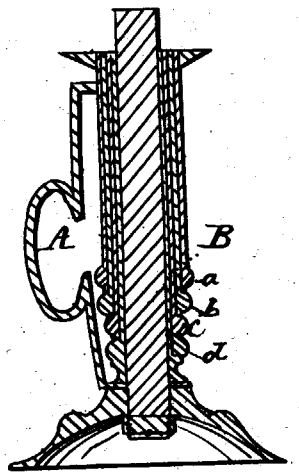
Figure 1:
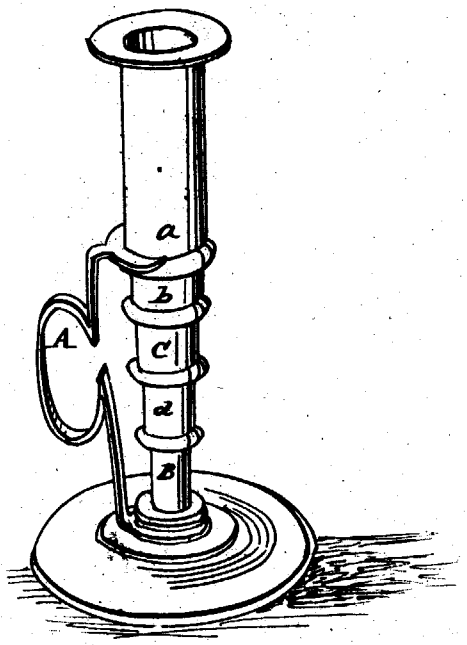

581X

B. DEARBORN.

Candlestick.

Patented Oct. 29, 1804.

[illegible] 29 1804

581X Benjamin Dearborn of Massachusetts.

Letters Patent

The Schedule referred to in these Letters Patent and making part of the same
containing a description in the words of the said Benjamin Dearborn himself
of the "Economical candlestick"

The Economical candlestick consists of a number of tubes or hollow
Cylinders sliding one within another of as many different grades
or size, as may be thought necessary for the various sizes of the candlesticks
which may be required to be used therein. Each of the upper tubes being
made a little longer than the next lower size, admits of fixing a
ring or a handle or both on the lower ends of all of them, whereby
they may be raised or lowered. In the center a solid cylinder or tube
(the ends of which may be closed) is made fast to the bottom of
the candlesticks by a screw or otherwise, round this the others move
up and down. The innermost tube or solid cylinder may be so
long as to rise above the others when they are drawn down, where
by the last part of the candle may be burnt independent of the sliding
Tubes and above them, so that the shadow of the rim on the outmost
or large tube may be greatly reduced at the last remains of the can
dle and the sliding tubes will thus be kept cool to receive the next
candle immediately without melting it. A spring or springs may
be placed in a variety of ways to keep the sliding tubes up. The best
mode of making a spring for this purpose may perhaps be by a han
dle which is fastened to the bottom having its top made to spring against
the side of the outer Tube. The Bottom may be round, square or any
shape required, and this instrument or any part of it may be made
of any metal or incombustible substance which may be preferred Exd.

Signed in presence of } [illegible]
William Thornton }
Henry H. [illegible] }

Benjamin Dearborn 336 words (Granted October 29. 1804)